(No Model.)

J. H. WILLIAMS.
LAP RING OR LINK.

No. 361,103. Patented Apr. 12, 1887.

Witnesses.
L. F. Gardner
A. S. Pattison

Inventor.
Jas. H. Williams,
per F. A. Lehmann,
Atty.

United States Patent Office.

JAMES H. WILLIAMS, OF CAMPBELLSVILLE, KENTUCKY, ASSIGNOR OF ONE-HALF TO R. A. JONES, OF SAME PLACE.

LAP RING OR LINK.

SPECIFICATION forming part of Letters Patent No. 361,103, dated April 12, 1887.

Application filed January 11, 1887. Serial No. 224,049. (No model.)

*To all whom it may concern:*

Be it known that I, JAMES H. WILLIAMS, of Campbellsville, in the county of Taylor and State of Kentucky, have invented certain new and useful Improvements in Lap Rings or Links; and I do hereby declare the following to be a full, clear, and exact description of the invention, such as will enable others skilled in the art to which it pertains to make and use the same, reference being had to the accompanying drawings, which form part of this specification.

My invention relates to an improvement in lap-rings; and it consists in, first, a ring or link which is formed of two plates which are flat upon their inner sides, so as to fit snugly together, and are provided with openings in their opposite edges to allow connection to be made with a chain, loop, or other devices, one of the plates being provided with two headed studs or projections and the other plate with a slot through one end and a recess in the other end; second, a lap ring or link, which is formed of two plates which have suitable openings made through opposite sides, one of the plates being provided with two headed studs and the other provided with a slot through one end and a recess in the other, the inner arm or prong of the recess being made longer than the outer one, so that the inner arm will also act as a stop to prevent the two plates being moved out of line with each other when the ring or link is being closed, as will be more fully described hereinafter.

The object of my invention is to produce a lap ring or link which is formed of two sliding parts, one of which is provided not only with a slot, to allow a lengthwise adjustment, but with a slotted end, which acts as a lock to prevent the ring or link from becoming accidentally opened while in use and as a stop to prevent the parts of the ring from being moved out of line with each other.

Figure 1:
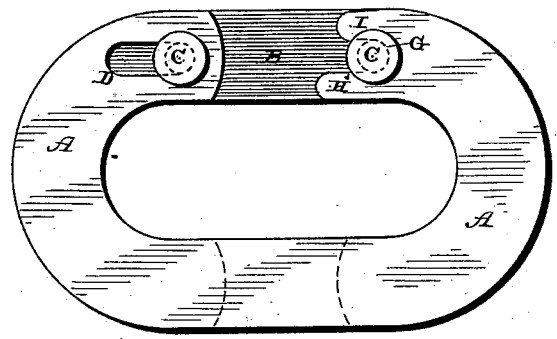
Figure 2:
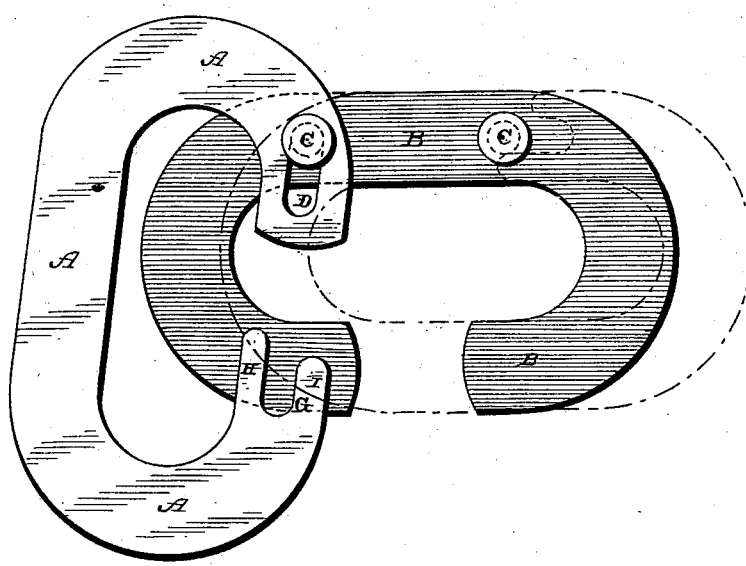

Figure 1 is a plan view of a link to which my invention is applied, showing it closed. Fig. 2 is a plan view of the same, showing the link open in solid lines and the parts closed together in dotted lines, ready to be locked together.

A B represent the two plates out of which the ring or link is formed, and which are made flat upon their inner sides, so as to fit snugly together. Each of these plates has an opening through its side, in the usual manner, so that connection can be readily made with a chain, loop, or device of any kind. One of these plates is provided with the two headed studs or projections C, which project at right angles from the plate on the side opposite the opening, and which studs are separated a suitable distance apart. The other plate of the link is provided with the slot D and the recess G, the inner prong or arm, H, of the recess being made longer than the outer one, I. One of the studs or projections passes through the slot in one end of the plate or link, and serves to connect the two loosely together. The two plates having an endwise movement in relation to each other the full length of the slot, the recess G serves as a lock by catching under or over the other stud or projection, and thus locking the end in position, so that the two plates are held rigidly in line with each other and cannot become accidentally opened while the links are in use.

In order to first open the link, one of the plates must be moved endwise in relation to each other until the recess G becomes freed from the stud or projection over which it has been catching, and then the two plates can be opened freely outward, as shown in Fig. 2, so as to make connection with any desired object. If the two projections H I upon the ends of the slotted link were made of the same length, the two plates, in being closed, could be moved past each other out of line. In order to prevent this, the prong or arm H is made of such a length that when the two plates are swung around in order to close the ring or link this arm or prong will strike against the stud and act as a stop, so that the two plates, in being closed together, can only move the proper distance.

If no second stud or projection and only the recess in the end of one of the plates were used, the link would be very unsafe and unsatisfactory in its action, and hence the lock is provided, so as to prevent the two parts of the ring or link from becoming accidentally opened at any time.

I am aware that a lap-ring has been formed of two parts, one of which is provided with two studs and the other with two slots, through which the studs pass, the two parts of the ring having only a sliding movement upon each other, and this I disclaim. My invention differs from this in providing one of the parts of my ring with studs and the other part with only one slot and two arms of unequal length, whereby the two parts are given both a sliding and a pivoted movement in relation to each other, and a lock is formed to prevent the parts from accidentally becoming opened.

Having thus described my invention, I claim—

1. A lap ring or link composed of two plates which have an endwise and pivoted movement one upon the other, one of the plates being provided with studs or projections C C and the other with a slot in one end and a recess in the other, substantially as shown and described.

2. In a lap ring or link, the combination of the two plates, which are pivoted one upon the other, one of them being provided with studs or projections and the other with a slot in one end and a recess in the other, the inner arm or prong of the recess being made longer than the outer one, so as to act as a stop.

In testimony whereof I affix my signature in presence of two witnesses.

JAMES H. WILLIAMS.

Witnesses:
GEO. W. REDMAN,
T. L. SHERRILL.